US012670343B2

(12) United States Patent
Wu et al.

(10) Patent No.: US 12,670,343 B2
(45) Date of Patent: Jun. 30, 2026

(54) METHOD AND APPARATUS FOR BACKSCATTER SIGNAL TRANSMISSION, COMMUNICATION DEVICE, AND READABLE STORAGE MEDIUM

(71) Applicant: VIVO MOBILE COMMUNICATION CO., LTD., Dongguan (CN)

(72) Inventors: Kai Wu, Dongguan (CN); Jiansheng Cai, Dongguan (CN); Yong Wang, Dongguan (CN); Yi Gu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/956,019

(22) Filed: Nov. 22, 2024

(65) Prior Publication Data

US 2025/0086411 A1     Mar. 13, 2025

Related U.S. Application Data

(63) Continuation of application No. PCT/CN2023/094718, filed on May 17, 2023.

(30) Foreign Application Priority Data

May 24, 2022    (CN) .......................... 202210571731.6

(51) Int. Cl.
    *G06K 7/10*       (2006.01)
    *H04B 5/20*       (2024.01)
    *H04B 5/45*       (2024.01)

(52) U.S. Cl.
    CPC ........... *G06K 7/10366* (2013.01); *H04B 5/20* (2024.01); *H04B 5/45* (2024.01)

(58) Field of Classification Search
    CPC ......... G06K 7/10366; H04B 5/20; H04B 5/45
    (Continued)

(56) References Cited

U.S. PATENT DOCUMENTS 11,797,813 B1 * 10/2023 Ensworth ........... G06K 19/0723
2004/0046642 A1     3/2004 Becker et al.
(Continued)

FOREIGN PATENT DOCUMENTS

CN      101499119 A    8/2009
CN      103353597 A   10/2013
(Continued)

OTHER PUBLICATIONS

International Search Report dated Jun. 23, 2023 in International Application No. PCT/CN2023/094718. English translation attached. Written Opinion of the International Search Authority dated Jun. 23, 2023 in International Application No. PCT/CN2023/094718. English translation attached.
(Continued)

*Primary Examiner* — Ahshik Kim

(57) ABSTRACT

This application discloses a method and apparatus for backscatter signal transmission, a communication device, and a readable storage medium. The method includes: determining, by a tag based on first information, a parameter related to transmission of a backscatter signal; where the first information includes at least one of the following: a first identifier, where the first identifier includes an identifier of the tag or a temporary identifier of the tag; a first value, where the first value is used to indicate a random number generated by the tag; a second value, where the second value is used to indicate a counter value of the tag; a third value, where the third value is used to indicate a counter step of the tag; a group identifier or intra-group identifier of the tag; a session number or a process number; or information received from a reader/writer.

19 Claims, 8 Drawing Sheets

(58) Field of Classification Search
USPC ........................................................ 235/451
See application file for complete search history.

(56) References Cited

U.S. PATENT DOCUMENTS

| | | | |
|---|---|---|---|
| 2016/0239692 A1 | 8/2016 | Lee et al. | |
| 2022/0407592 A1* | 12/2022 | Xu | H04B 7/22 |
| 2023/0097295 A1* | 3/2023 | Shao | G06K 19/07754 |
| | | | 375/308 |
| 2023/0115786 A1* | 4/2023 | Abedi | H04B 1/06 |
| | | | 455/230 |
| 2023/0177291 A1* | 6/2023 | Kim | G06K 7/10366 |
| | | | 340/10.3 |
| 2023/0179239 A1* | 6/2023 | Lopez | H04B 1/0475 |
| | | | 455/114.2 |

FOREIGN PATENT DOCUMENTS

| | | | |
|---|---|---|---|
| CN | 108052855 A | 5/2018 | |
| CN | 113065365 A | 7/2021 | |
| EP | 3206166 B1 | 10/2020 | |
| JP | 4808806 B2 | 11/2011 | |

OTHER PUBLICATIONS

Extended European Search Report dated Aug. 4, 2025 received in corresponding European Application No. EP23810917.7.
"Information technology—Radio frequency identification for item management—Part 63: Parameters for air interface communications at 860 MHz to 960 MHz Type C", ISO/IEC 18000-63:2015, IEC, 3, Rue De Varembe, Po Box 131, CH-1211 Geneva 20, Switzerland, Oct. 20, 2015 (Oct. 20, 2015), pp. 1-326, XP082047125.

* cited by examiner

Command (command),
continuous wave
(continuous wave)

Reader/writer
(Reader)

Tag (Tag)

Backscatter
(Backscatter)

Base station

Terminal

Tag

601

A tag determines, based on first information, a parameter related to transmission of a backscatter signal Fc-Fs2          Fc-Fs1          Fc-Fs0     Fc     Fc+Fs0          Fc+Fs1          Fc+Fs2

METHOD AND APPARATUS FOR BACKSCATTER SIGNAL TRANSMISSION, COMMUNICATION DEVICE, AND READABLE STORAGE MEDIUM

CROSS-REFERENCE TO RELATED APPLICATIONS

This application is a continuation of International Patent Application No. PCT/CN2023/094718, filed on May 17, 2023, which claims priority to Chinese Patent Application No. 202210571731.6, filed in China on May 24, 2022, both of which are incorporated herein by reference in their entirety.

TECHNICAL FIELD

This application pertains to the field of communication technologies, and specifically relates to a method and apparatus for backscatter signal transmission, a communication device, and a readable storage medium.

BACKGROUND

In current backscatter communication systems, tags are used to backscatter incident carrier wave signals for signal transmission. Due to the presence of a large number of tags (Tag), tags perform information transmission via backscatter signals at a randomly determined time point. In a case that there are a large number of tags, different tags may perform transmission of backscatter signals at the same time.

SUMMARY

Embodiments of this application provide a method and apparatus for backscatter signal transmission, a communication device, and a readable storage medium.

According to a first aspect, a method for backscatter signal transmission is provided, including:

determining, by a tag based on first information, a parameter related to transmission of a backscatter signal; where
the first information includes at least one of the following:
a first identifier, where the first identifier includes an identifier of the tag or a temporary identifier of the tag;
a first value, where the first value is used to indicate a random number generated by the tag;
a second value, where the second value is used to indicate a counter value of the tag;
a third value, where the third value is used to indicate a counter step of the tag;
a group identifier or intra-group identifier of the tag;
a session number or a process number; or
information received from a reader/writer.

According to a second aspect, a method for backscatter signal transmission is provided, including:

determining, by a reader/writer based on first information, a parameter related to transmission of a backscatter signal; and
performing, by the reader/writer, detection for the backscatter signal based on the parameter, where
the first information includes at least one of the following:
a first identifier, where the first identifier includes an identifier of a tag or a temporary identifier of the tag;
a first value, where the first value is used to indicate a random number generated by the tag;

a second value, where the second value is used to indicate a counter value of the tag;
a third value, where the third value is used to indicate a counter step of the tag;
a group identifier or intra-group identifier of the tag;
a session number or a process number; or
information received from a reader/writer.

According to a third aspect, an apparatus for backscatter signal transmission, applied to a tag, where the apparatus includes:

a first determining module configured to determine, based on first information, a parameter related to transmission of a backscatter signal; where
the first information includes at least one of the following:
a first identifier, where the first identifier includes an identifier of the tag or a temporary identifier of the tag;
a first value, where the first value is used to indicate a random number generated by the tag;
a second value, where the second value is used to indicate a counter value of the tag;
a third value, where the third value is used to indicate a counter step of the tag;
a group identifier or intra-group identifier of the tag;
a session number or a process number; or
information received from a reader/writer.

According to a fourth aspect, an apparatus for backscatter signal transmission, applied to a reader/writer, where the apparatus includes:

a third determining module configured to determine, based on first information, a parameter related to transmission of a backscatter signal; and
a detection module configured to perform detection for the backscatter signal based on the parameter, where
a first identifier, where the first identifier includes an identifier of the tag or a temporary identifier of the tag;
a first value, where the first value is used to indicate a random number generated by the tag;
a second value, where the second value is used to indicate a counter value of the tag;
a third value, where the third value is used to indicate a counter step of the tag;
a group identifier or intra-group identifier of the tag;
a session number or a process number; or
information received from a reader/writer.

According to a fifth aspect, a communication device is provided, including a processor, a memory, and a program or an instruction stored in the memory and capable of running on the processor, and when the program or instruction is executed by the processor, the steps of the method according to the first aspect or the second aspect are implemented.

According to a sixth aspect, a readable storage medium is provided, where the readable storage medium stores a program or an instruction, and when the program or instruction is executed by a processor, the steps of the method according to the first aspect or the second aspect are implemented.

According to a seventh aspect, a chip is provided, where the chip includes a processor and a communication interface, where the communication interface is coupled to the processor, and the processor is configured to run a program or an instruction so as to implement the steps of the method according to the first aspect or the second aspect.

According to an eighth aspect, a computer program/program product is provided, where the computer program/program product is stored in a non-transient storage medium, and the program/program product is executed by at least one processor so as to implement the steps of the method according to the first aspect or the second aspect.

According to a ninth aspect, a communication system is provided, where the communication system includes a terminal and a network-side device. The terminal is configured to execute the steps of the method according to the first aspect, and the network-side device is configured to execute the steps of the method according to the second aspect.

DESCRIPTION OF EMBODIMENTS

Figure 1:
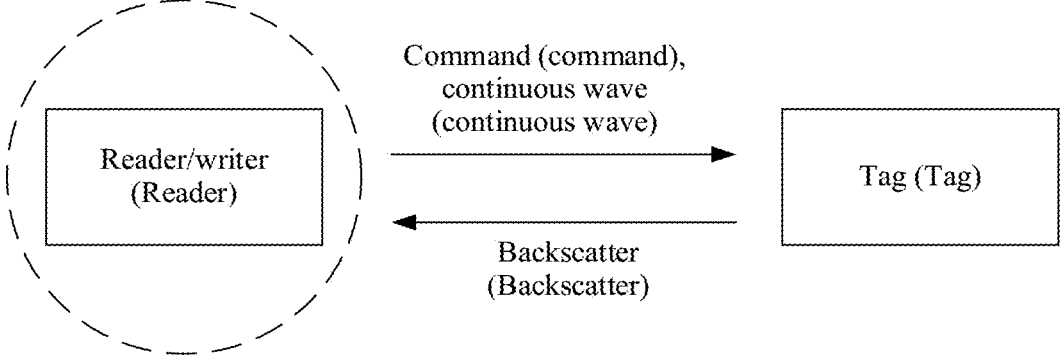
FIG. 1 is a first schematic diagram of backscatter communication.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application fall within the protection scope of this application.

The terms "first", "second", and the like in the specification and claims of this application are used to distinguish between similar objects rather than to describe a specific order or sequence. It should be understood that terms used in this way are interchangeable in appropriate circumstances such that the embodiments of this application can be implemented in other orders than the order illustrated or described herein. In addition, objects distinguished by "first" and "second" are generally of a same type, and the quantities of the objects are not limited, for example, there may be one or more first objects. In addition, "and/or" in the specification and claims represents at least one of connected objects, and the character "/" generally indicates that the associated objects have an "or" relationship.

It should be noted that technologies described in the embodiments of this application are not limited to a long term evolution (Long Term Evolution, LTE) or LTE-Advanced (LTE-Advanced, LTE-A) system, and may also be applied to other wireless communication systems, for example, code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency Division Multiple Access, SC-FDMA), and other systems. The terms "system" and "network" are often used interchangeably in the embodiments of this application. The technologies described may be used in the above-mentioned systems and radio technologies as well as other systems and radio technologies. In the following descriptions, a new radio (New Radio, NR) system is described for illustrative purposes, and NR terms are used in most of the following descriptions, although these technologies may also be applied to other applications than the NR system application, for example, to the $6^{th}$ generation ($6^{th}$ Generation, 6G) communication system.

To facilitate understanding of the embodiments of this application, the following technical points are described first.

I. Backscatter Communication (Backscatter Communication, BSC)

In backscatter communication, backscatter communication devices use radio frequency signals from other devices or environments for signal modulation to transmit information of backscatter communication devices.

Backscatter communication devices can include the following.

(1) Backscatter communication devices in traditional radio frequency identification (Radio Frequency Identification, RFID), generally a tag (Tag), which is a passive internet of things (Internet of Things, IoT) device (or referred to as Passive-IoT).

(2) Semi-passive (semi-passive) tags. Tags of this type have certain amplification capability for downlink reception or uplink reflection.

(3) Tags with active transmission capability (or referred to as active tags). Tags of this type can transmit information to readers/writers (such as readers (reader)) without relying on incident signal reflection.

Readers/writers, which are devices for reading and writing radio frequency tags, are one of two important components (tags and readers/writers) of radio frequency identification systems. Devices for reading and writing radio frequency tags also have other popular names based on their specific implementation functions, such readers (Reader), interrogators (Interrogator), communicators (Communicator), scanners (Scanner), readers and writers (Reader and Writer), programmers (Programmer), reading devices (Reading Device), portable readout devices (Portable Readout Device), and automatic equipment identification devices (Automatic Equipment Identification Device, AEI).

As shown in FIG. 1, there are two links (links) between a reader/writer and a tag, link 1 is a link from the reader/writer to the tag, and link 2 is a link from the tag to the reader/writer.

A simple implementation is that when the tag needs to transmit '1', the tag reflects an incident carrier wave signal, and when the tag needs to transmit '0', the tag performs no reflection.

A backscatter communication device controls a reflection coefficient Γ of a circuit by adjusting its internal impedance, thereby changing an amplitude, a frequency, a phase, and the like of an incident signal to achieve signal modulation. The reflection coefficient of the signal can be expressed as:

$$\Gamma = \frac{Z_1 - Z_0}{Z_1 + Z_0} = |\Gamma|e^{j\theta_T}$$

where $Z_0$ is antenna characteristic impedance, and $Z_1$ is load impedance. If the incident signal is $S_{in}(t)$, an output signal is $$S_{out}(t) = S_{in}(t)|\Gamma|e^{j\theta_T}.$$

Figure 2:
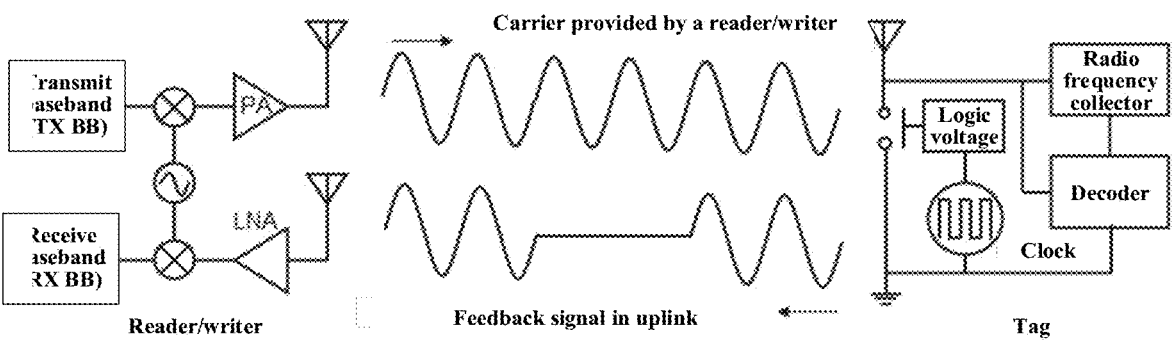
FIG. 2 is a second schematic diagram of backscatter communication.

Therefore, reasonably controlling the reflection coefficient can correspondingly implement amplitude modulation, frequency modulation, or phase modulation, as shown in FIG. 2.

Figure 3:
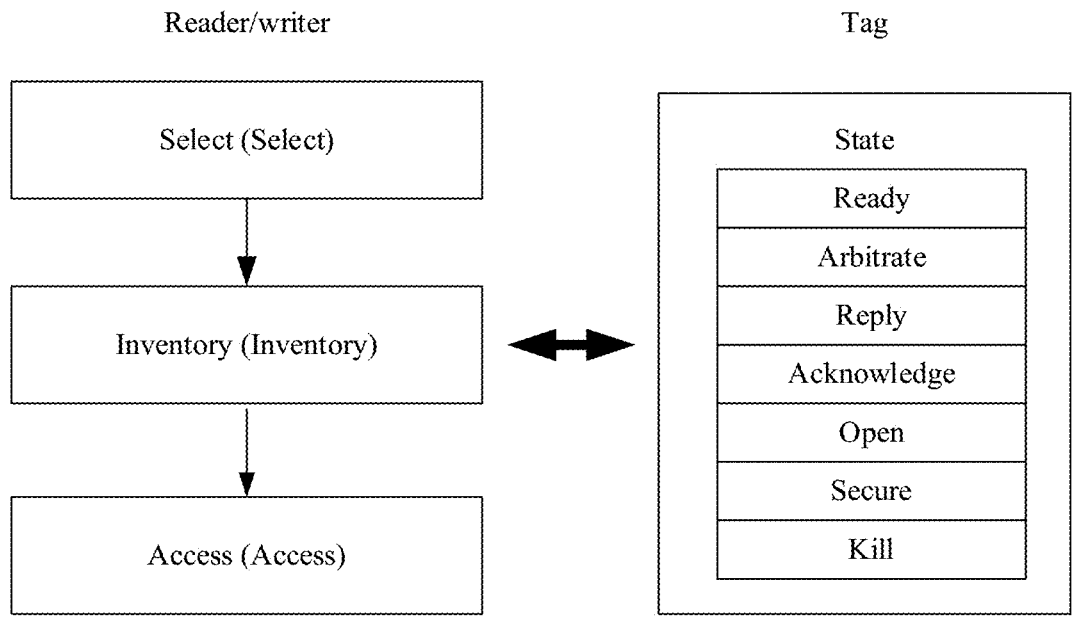
FIG. 3 is a schematic diagram of information transmission between a reader/writer and a tag.

II. Information Transmission Between Reader/Writer and Tag, as Shown in FIG. 3.

Instructions of readers/writers are shown in Table 1.

TABLE 1

| Reader/writer instructions | | |
|---|---|---|
| Type of operation | Instruction | Function |
| Select (Select) | Select | Selects a tag |
| Inventory (Inventory) | Query (Query) | Starts an inventory |
| | | Generates a random number to determine a response time |
| | Query adjust (Query Adjust) | Adjusts the number of original slots (Slot) of a tag |
| | Query repeat (QueryRep) | A tag reduces the number of its slots |
| | Electronic product code (Electronic Product code, EPC) reply (acknowledgement, (Acknowledgement, ACK)) | An instruction responded by the reader/writer to the tag |
| | Negative acknowledgment (Negative Acknowledgment, NAK) | An instruction issued by a reader/writer |
| | | A tag returns to the arbitrate (Arbitrate) state |
| Access (Access) | Random request (Req_RN) | Requests a tag to generate a random number |
| | Read (read) | Reads data from a certain location in a storage of a tag |
| | Write (Write) | Writes data to a storage of a tag |
| | Kill (Kill) | No longer responds to any reader/writer |
| | | Prevents privacy leakage |
| | | A tag can no longer be used |
| | Lock (Lock) | A tag can no longer perform writing |
| | | Prevents data from being arbitrarily tampered with |
| | Access (optional) | In a case that a tag has a password, turns the tag from the open (Open) state to the secure (Secure) state |
| | Block Write (optional) | Writes to multiple blocks at a time |
| | Lock erase (optional) | Clears multiple blocks from a storage of a single tag |

States of tags are shown in Table 2.

TABLE 2

| Tag states | |
|---|---|
| Tag state | Description |
| Ready (Ready) | Not in a current inventory operation |
| Arbitrate (Arbitrate) | The tag is currently in an inventory operation |
| | With the slot number being not zero yet, indicates still being in the state of "waiting" |
| Replay (Replay) | Generates a 16-bit (bit) random number for a reader/writer |
| | Responds upon receiving an ACK message |
| | Returns to the arbitrate state if no ACK message is received |
| Acknowledge (Acknowledge, ACK) | Enters any state except for the killed state from this state |
| Open (open) | A tag with a non-zero password in an acknowledge state has received a random request instruction |

TABLE 2-continued

Tag states

| Tag state | Description |
| --- | --- |
| Secure (Secure) | A tag with a zero password in an acknowledge state has received a random request instruction transmitted by a reader/writer |
| Killed (Killed) | Permanently unusable |

Currently, in the protocol design of ultra high frequency (Ultra High Frequency, UHF) RFID, in an inventory mode, a tag is required to respond with a reply (Reply) after a reader/writer transmits a query instruction (Query), that is, generates a 16-bit random number for the reader/writer. Then the reader/writer transmits the sequence to the tag through an ACK instruction, and the tag transmits relevant data to the reader/writer.

III. Backscatter Application Scenarios

Figure 4:
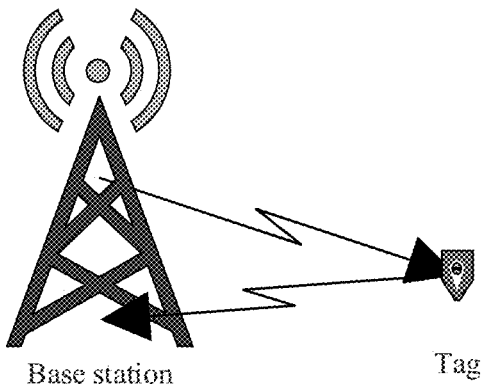
FIG. 4 is a schematic diagram of a backscatter (Backscatter) application scenario.

Scenario 1: Scenarios for cellular backscatter without terminal assisted (Scenarios for cellular backscatter-w/o UE assisted), as shown in FIG. 4.

Figure 5A:
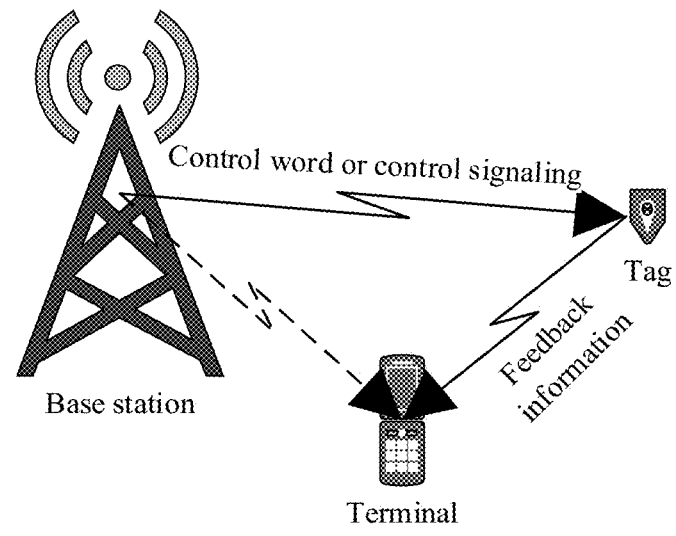
FIGS. 5a, 5b, and 5c are schematic diagrams of another backscatter application scenario.
Figure 5B:
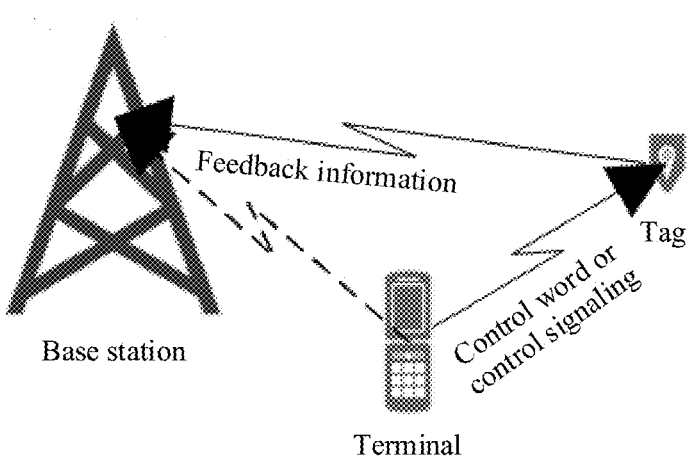
Figure 5C:
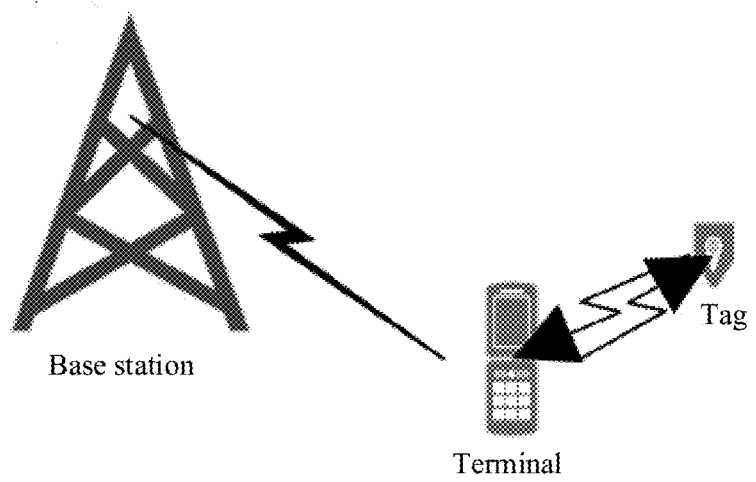

Scenario 2: Scenarios for cellular backscatter with terminal assisted (Scenarios for cellular backscatter with UE assisted), as shown in FIGS. 5a, 5b, and 5c. In FIG. 5a, a terminal receives feedback information transmitted by a tag. In FIG. 5b, a terminal transmits a control word (control word, CW) or control signaling to a tag. The control signaling includes at least one of the following types: select, inventory, and access. A network device (such as a base station) receives feedback information from the tag. In FIG. 5c, a terminal transmits a carrier and receives a backscatter signal from a tag. After receiving the backscatter signal from the tag, the terminal forwards collected information to a network device (such as a base station).

IIII. Contention-Based Communication Process of Backscatter Communication System In existing backscatter communication systems, readers/writers typically can receive only a backscatter signal of one tag at a time. For example, in an RFID inventory process, in a case that a reader/writer transmits a control command to start an inventory process, a value Q is indicated. The tag randomly selects a value q from locally generated values in a range of $\{0, \ldots, 2^Q-1\}$. A tag with a current random value of 0 responds to the control command of the reader/writer and performs transmission of a backscatter signal. A tag with a current random value not equal to 0 does not perform transmission of a backscatter signal for the time being. After completing communication with the tag with a random value of 0, the reader/writer can continue to transmit a control command (for example, queryRep), for example, indicating the tag to decrement the generated random number by 1. A tag with a random value reduced to 0 responds to the control command and performs backscatter transmission.

The above process is a random multiple access process, and there is a possibility that no tags perform backscatter transmission. For example, no tags have a current random number of 0. There is also a possibility that multiple tags may locally generate the same random number, leading to the possibility that the multiple tags perform backscatter transmission simultaneously at a certain time. In this case, the reader/writer is highly unlikely to detect a backscatter signal from any tag and does not provide feedback to the tag to indicate that a backscatter signal has been received. In this case, these tags continue to receive a control command from the reader/writer and wait for a new occasion for backscatter transmission. Therefore, in transmitting a control command, the reader/writer should select a reasonable Q value and can gradually adjust the Q value in an inventory process to reduce the probability of conflicts in a process of communicating with multiple tags. Certainly, this also means that the time to complete communication with the multiple tags is prolonged.

In existing solutions, if multiple tags have the same parameter for transmission of backscatter signals at the same time, a reader/writer side cannot detect the backscatter signals of the multiple tags at the same time, negatively affecting the efficiency of completing backscatter communication with multiple tags.

In other words, in a case that there are a large number of tags, different tags may perform transmission of backscatter signals at the same time, leading to a conflict among backscatter signals. This degrades the performance of readers/writers in receiving backscatter signals.

Embodiments of this application provide a method and apparatus for backscatter signal transmission, a communication device, and a readable storage medium, to resolve the issue that a conflict among backscatter signals degrades the performance of readers/writers in receiving backscatter signals.

The following describes in detail the method and apparatus for backscatter signal transmission, a communication device, and a readable storage medium provided in the embodiments of this application through some embodiments and application scenarios thereof with reference to the accompanying drawings.

Figure 6:
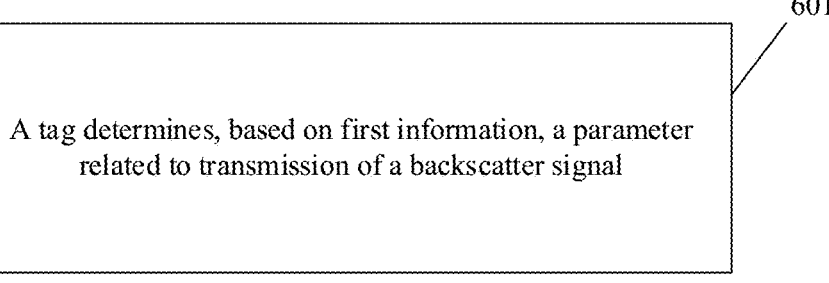
FIG. 6 is a first flowchart of a method for backscatter signal transmission according to an embodiment of this application.

Referring to FIG. 6, an embodiment of this application provides a method for backscatter signal transmission applied to a tag. Specifically, the steps include step 601.

Step 601: The tag determines, based on first information, a parameter related to transmission of a backscatter signal.

The first information includes at least one of the following.

(1) A first identifier, where the first identifier includes an identifier of the tag or a temporary identifier of the tag.

For example, the identifier of the tag is A, and the temporary identifier of the tag is B.

The first identifier being a temporary identifier (Identifier, ID) of the tag is used as an example. Tag ID #0 uses parameter 0, tag ID #1 uses parameter 1, . . . , and tag ID #m uses parameter m for backscatter transmission, where $0<=m<=M-1$. The tag can perform a preset operation based on the ID value to determine the parameter of the backscatter signal. For example, if mod(ID, M)=m, parameter m is used for the transmission of the backscatter signal, where M is indicated by a reader/writer or predefined.

(2) A first value, where the first value is used to indicate a random number generated by the tag.

For example, the random number generated by the tag is C.

(3) A second value, where the second value is used to indicate a counter value of the tag.

For example, the counter value generated by the tag is D, and an initial value of a counter for the tag can be the random number generated by the tag.

Tags with current counter values of 0, 1, . . . M–1 can simultaneously perform transmission of backscatter signals, and tags having different counter values use different parameters for backscatter transmission. Tag 0 uses parameter 0, tag 1 uses parameter 1, . . . , tag m uses parameter m for transmission of backscatter signals, where 0<=m<=M–1, and M is indicated by the reader/writer or predefined.

(4) A third value, where the third value is used to indicate a counter step of the tag.

For example, the counter step generated by the tag is E.

(5) A group identifier or intra-group identifier (ID) of the tag.

In this way, the tag can perform the transmission of the backscatter signal in a grouping manner, and the tag can include the group identifier and the intra-group identifier.

(6) A session number (session number) or a process number (process number).

In this way, the reader/writer can use multiple sessions or processes to perform backscatter communication with multiple tags.

(7) Information received from the reader/writer.

For example, the reader/writer indicates the tag to perform the transmission of the backscatter signal at a specific frequency. It can be understood that the specific content of the information indicated by the reader/writer is not limited.

In this embodiment of this application, since the content of the first information used by the tag to generate the parameter related to the transmission of the backscatter signal is related to the tag itself or contains non-fixed values, multiple tags can generate different parameters based on different first information. Thus, the multiple tags can perform transmission of backscatter signals using different parameters at the same time.

In an embodiment of this application, the parameter related to the transmission of the backscatter signal is used to indicate frequency information, and the frequency information is used by the tag to perform the transmission of the backscatter signal. This ensures that multiple tags transmit backscatter signal parameters in a frequency division multiplexing manner.

Optionally, the parameter includes at least one of the following.

(1) A first parameter, where the first parameter is used to indicate performing the transmission of the backscatter signal.

For example, the first parameter is 1-bit indication information, where the value of the 1-bit indication information is "1", indicating performing the transmission of the backscatter signal.

(2) A second parameter, where the second parameter is used to indicate not performing the transmission of the backscatter signal.

For example, the first parameter is 1-bit indication information, where the value of the 1-bit indication information is "0", indicating not performing the transmission of the backscatter signal.

(3) A third parameter, where the third parameter is used to indicate a frequency of the backscatter signal.

For example, tag 0 performs transmission of a backscatter signal at frequency 0, tag 1 performs transmission of a backscatter signal at frequency 1, and tag 2 performs transmission of a backscatter signal at frequency 2. In this way, multiple tags can perform backscatter transmission at different frequencies at the same time, reducing conflicts by using frequency division multiplexing for transmission of backscatter signals.

Optionally, the third parameter is a first frequency shift, where the first frequency shift is used to indicate a frequency shift relative to an incident carrier frequency. The incident carrier frequency or the first frequency shift can be predefined or indicated by the reader/writer.

(4) A subcarrier (subcarrier) frequency of the backscatter signal.

The subcarrier can also be described as a sub-carrier.

For example, tag 0 performs transmission of a backscatter signal on subcarrier 0, tag 1 performs transmission of a backscatter signal on subcarrier 1, and tag 2 performs transmission of a backscatter signal on subcarrier 2. In this way, multiple tags can perform backscatter transmission at different subcarriers at the same time.

Optionally, the subcarrier frequency of the backscatter signal can be N times or 1/N times a reference subcarrier frequency, where N is a natural number greater than 0. The reference subcarrier frequency and N can be predefined or indicated by the reader/writer.

(5) A first duration or first amplitude switching cycle of the backscatter signal.

For example, a first duration or first amplitude switching cycle of the transmission of a backscatter signal of tag 0 is X, a first duration or first amplitude switching cycle of transmission of a backscatter signal of tag 1 is Y, and a first duration or first amplitude switching cycle of transmission of a backscatter signal of tag 2 is Z, where X, Y, and Z are different, leading to different backscatter signal frequencies. In this way, multiple tags can perform backscatter transmission at the same time using different first durations or first amplitude switching cycles, avoiding conflicts.

Optionally, the first duration is K times or 1/K times a reference amplitude duration, where K is a natural number greater than 0. The reference amplitude duration and K can be predefined or indicated by the reader/writer.

In an embodiment of this application, the method further includes receiving, by the tag, second information, where the second information is used to indicate the tag to determine, based on the first information, the parameter related to the transmission of the backscatter signal, or the second information is used to indicate the tag to determine, based on a specific session number or process number, the parameter related to the transmission of the backscatter signal.

For example, the tag receives second information from the reader/writer. In this way, the reader/writer can explicitly indicate the tag to use different parameters for transmission of backscatter signals at the same time, or the reader/writer can directly indicate the tag to determine, based on a specific session number or process number, the parameter related to the transmission of the backscatter signal.

In an embodiment of this application, the determining, by a tag based on first information, a parameter related to transmission of a backscatter signal includes:

in a case that the first information includes the third value and the third value is greater than 1, determining, by the tag based on the first information, the parameter related to the transmission of the backscatter signal.

For example, if the counter step of the tag is E, and E>1, the tag determines the parameter related to the transmission of the backscatter signal based on the first information. It can be understood that the reader/writer can indicate the tag to determine, based on the first information, the parameter related to the transmission of the backscatter signal in a case that the counter step E of the tag is greater than 1.

In an embodiment of this application, the method further includes:

in a case that the counter value of the tag is any one of 0 to a fourth value, performing, by the tag, the transmission of the backscatter signal, where the fourth value is equal to the third value minus 1, and the third value is greater than or equal to 1.

In this way, tags with counter values of 0 . . . E−1 can perform transmission of backscatter signals simultaneously, minimizing the chance that no tags perform transmission of backscatter signals. In addition, in a case that multiple tags can perform transmission of backscatter signals, the multiple tags can use different parameters for transmission of the backscatter signals, reducing the probability of conflicts.

In an embodiment of this application, the method further includes:

receiving, by the tag, third information, where the third information is used to indicate the tag to subtract the third value from the counter value, and for example, the reader/writer can indicate, through a control command, the tag to subtract the counter value by the step.

In an embodiment of this application, the determining, by a tag based on first information, a parameter related to transmission of a backscatter signal includes one of the following:

(1) In a case that the group identifier of the tag is a specific group identifier, determining, by the tag, the parameter based on the intra-group identifier of the tag.

For example, the tag determines parameters such as frequency, subcarrier frequency, and first amplitude duration/first amplitude switching cycle based on the intra-group identifier of the tag.

(2) In a case that the intra-group identifier of the tag is a specific intra-group identifier, determining, by the tag, the parameter based on the group identifier of the tag.

For example, the tag determines parameters such as frequency, subcarrier frequency, and first amplitude duration/first amplitude switching cycle based on the group identifier of the tag. In an embodiment of this application, the group identifier or intra-group identifier of the tag is determined based on one of the following: the first identifier; the first value; the second value; or information indicated by the reader/writer.

In an embodiment of this application, the determining, by the tag, the parameter based on the group identifier or intra-group identifier of the tag includes:

determining, by the tag as the parameter, a remainder obtained by dividing the first identifier (A or B), the first value (C), or the second value (D) by a fifth value; where the fifth value is indicated by the reader/writer or pre-defined.

That is, the tag determines the parameter based on m=mod (A/B/C/D, M), where M is indicated by the reader/writer or predefined, and the tag performs the transmission of the backscatter signal based on parameter m.

In an embodiment of this application, the method further includes:

receiving, by the tag, fourth information, where the fourth information is used to indicate at least one of the following:

(1) modifying the group identifier of the tag;

(2) performing, by a tag with a specific group identifier, the transmission of the backscatter signal;

(3) modifying the intra-group identifier of the tag; or (4) performing, by a tag with a specific intra-group identifier, the transmission of the backscatter signal.

In an embodiment of this application, at least one of the first information, the second information, the third information, and the fourth information is carried in a control command transmitted by the reader/writer; where the control command includes at least one of the following: select command, query command, query repeat command, and query adjust command.

In an embodiment of this application, the method further includes:

performing, by the tag, the transmission of the backscatter signal based on a first requirement and the parameter of the backscatter signal; where the first requirement includes: in a case that the tag uses any one of the parameter of the backscatter signal to perform the transmission of the backscatter signal, if the numbers of bits transmitted are the same, second durations for transmitting the same number of bits are the same.

In an embodiment of this application, in a case that a subcarrier frequency of the backscatter signal is N times a reference subcarrier frequency, the number of amplitude switching cycles corresponding to the subcarrier frequency of the backscatter transmission in the second duration is 1/N the number of amplitude switching cycles corresponding to the reference subcarrier frequency.

In an embodiment of this application, the amplitude switching cycle successively includes a high amplitude and a low amplitude, or a low amplitude and a high amplitude, where a sum of a duration of the high amplitude and a duration of the low amplitude is the amplitude switching cycle.

In an embodiment of this application, information carried in the backscatter signal includes at least one of the following: the temporary identifier of the tag, a product code, a handle of the tag, an error code, or data.

In this embodiment of this application, the tag determines, based on the first information, the parameter related to the transmission of the backscatter signal. Since the content of the first information is related to the tag itself or contains non-fixed values, multiple tags can generate different parameters based on different first information. Thus, the multiple tags can perform transmission of backscatter signals using different parameters at the same time, enabling the reader/writer to detect the backscatter signals from the multiple tags at the same time. This can support the multiple tags in performing backscatter transmission at the same time, improving the efficiency of completing backscatter communication between the reader/writer and tags in a case of many tags.

Figure 7:
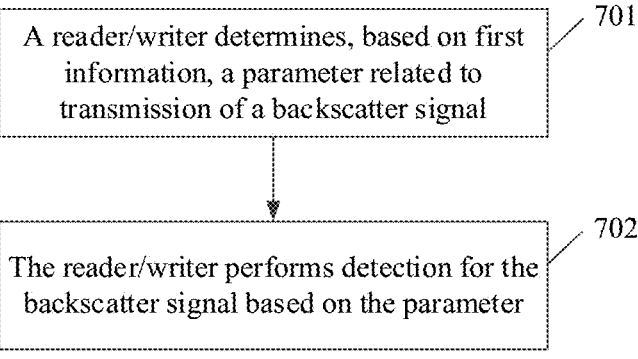
FIG. 7 is a second flowchart of a method for backscatter signal transmission according to an embodiment of this application.

Referring to FIG. 7, an embodiment of this application provides a method for backscatter signal transmission applied to a reader/writer. Specifically, the steps include step 701 and step 702.

Step 701: The reader/writer determines, based on first information, a parameter related to transmission of a backscatter signal.

Step 702: The reader/writer performs detection for the backscatter signal based on the parameter.

The first information includes at least one of the following:

(1) a first identifier, where the first identifier includes an identifier of the tag or a temporary identifier of the tag;

(2) a first value, where the first value is used to indicate a random number generated by the tag;

(3) a second value, where the second value is used to indicate a counter value of the tag;

(4) a third value, where the third value is used to indicate a counter step of the tag;

(5) a group identifier or intra-group identifier of the tag;

(6) a session number (session number) or a process number (process number); and (7) information received from a reader/writer.

In an embodiment of this application, the parameter includes at least one of the following:

(1) A first parameter, where the first parameter is used to indicate performing the transmission of the backscatter signal.

(2) A second parameter, where the second parameter is used to indicate not performing the transmission of the backscatter signal.

(3) A third parameter, where the third parameter is used to indicate a frequency of the backscatter signal.

(4) A subcarrier (subcarrier) frequency of the backscatter signal.

The subcarrier can also be described as a sub-carrier.

(5) A first duration or first amplitude switching cycle of the backscatter signal.

In an embodiment of this application, the performing, by the reader/writer, detection for the backscatter signal based on the parameter includes:

performing, by the reader/writer, detection for the backscatter signal based on the parameter in at least one bandwidth range.

In an embodiment of this application, the third parameter is a first frequency shift, and the first frequency shift is used to indicate a frequency shift relative to an incident carrier frequency;

the subcarrier frequency of the backscatter signal is N times or 1/N times a reference subcarrier frequency; or the first duration is K times or 1/K times a reference amplitude duration; where N and K are natural numbers greater than 0.

In an embodiment of this application, one or more of the incident carrier frequency, the reference subcarrier frequency, the reference amplitude duration, the first frequency shift, N, and K are predefined or determined by the reader/writer.

In an embodiment of this application, the method further includes:

transmitting, by the reader/writer, second information, where the second information is used to indicate the tag to determine, based on the first information, the parameter related to the transmission of the backscatter signal, or the second information is used to indicate the tag to determine, based on a specific session number or process number, the parameter related to the transmission of the backscatter signal.

In an embodiment of this application, the method further includes:

transmitting, by the reader/writer, third information, where the third information is used to indicate the tag to subtract the third value from the counter value.

In an embodiment of this application, the group identifier or intra-group identifier of the tag is determined based on one of the following: the first identifier; the first value; the second value; or information indicated by the reader/writer.

In an embodiment of this application, the method further includes transmitting, by the reader/writer, fourth information, where the fourth information is used to indicate at least one of the following:

(1) modifying the group identifier of the tag;

(2) performing, by a tag with a specific group identifier, the transmission of the backscatter signal;

(3) modifying the intra-group identifier of the tag; or (4) performing, by a tag with a specific intra-group identifier, the transmission of the backscatter signal.

In an embodiment of this application, at least one of the first information, the second information, the third information, and the fourth information is carried in a control command; where the control command includes at least one of the following: select command, query command, query repeat command, and query adjust command.

In an embodiment of this application, the reader/writer includes at least one of the following: a terminal, a base station, a specialized receiving device, and a specialized transmitting device.

In this embodiment of this application, the reader/writer determines, based on the first information, the parameter related to the transmission of the backscatter signal. Since the content of the first information is related to the tag itself or contains non-fixed values, multiple tags can perform transmission of backscatter signals using different parameters at the same time, enabling the reader/writer to detect the backscatter signals from the multiple tags based on the parameter at the same time. This can support the multiple tags in performing backscatter transmission at the same time, improving the efficiency of completing backscatter communication between the reader/writer and tags in a case of many tags.

The applicable scenarios of the embodiments of this application include: direct communication between tags and base stations, and communication between tags and base stations with UE assisted.

The embodiments of this application are described below with reference to Embodiment 1 and Embodiment 2.

Embodiment 1: Different Tags Use Different Parameters for Transmission of Backscatter Signals After receiving the control command from the reader/writer, the tags can use different parameters to transmit backscatter signals, that is, the reader/writer can indicate whether the tags use the first information to determine parameters of backscatter signals.

Different tags use different parameters of backscatter signal. Detailed manners are as follows.

Manner 1: Performing transmission of a backscatter signal at a specific frequency.

For example, tag0 performs transmission of a backscatter signal at frequency 0, tag1 performs transmission of a backscatter signal at frequency 1, and tag2 performs transmission of a backscatter signal at frequency 2. In this way, multiple different tags can perform transmission of backscatter signals at different frequencies at the same time.

Optionally, the tag generates backscatter signals of different frequencies through a local oscillator; or the tag generates backscatter signals of different frequencies by changing a device in a circuit or a device parameter. Optionally, the device may be a capacitor.

Manner 2: Using different subcarriers (or sub-carriers) to modulate information carried by backscatter signals.

Figure 8:
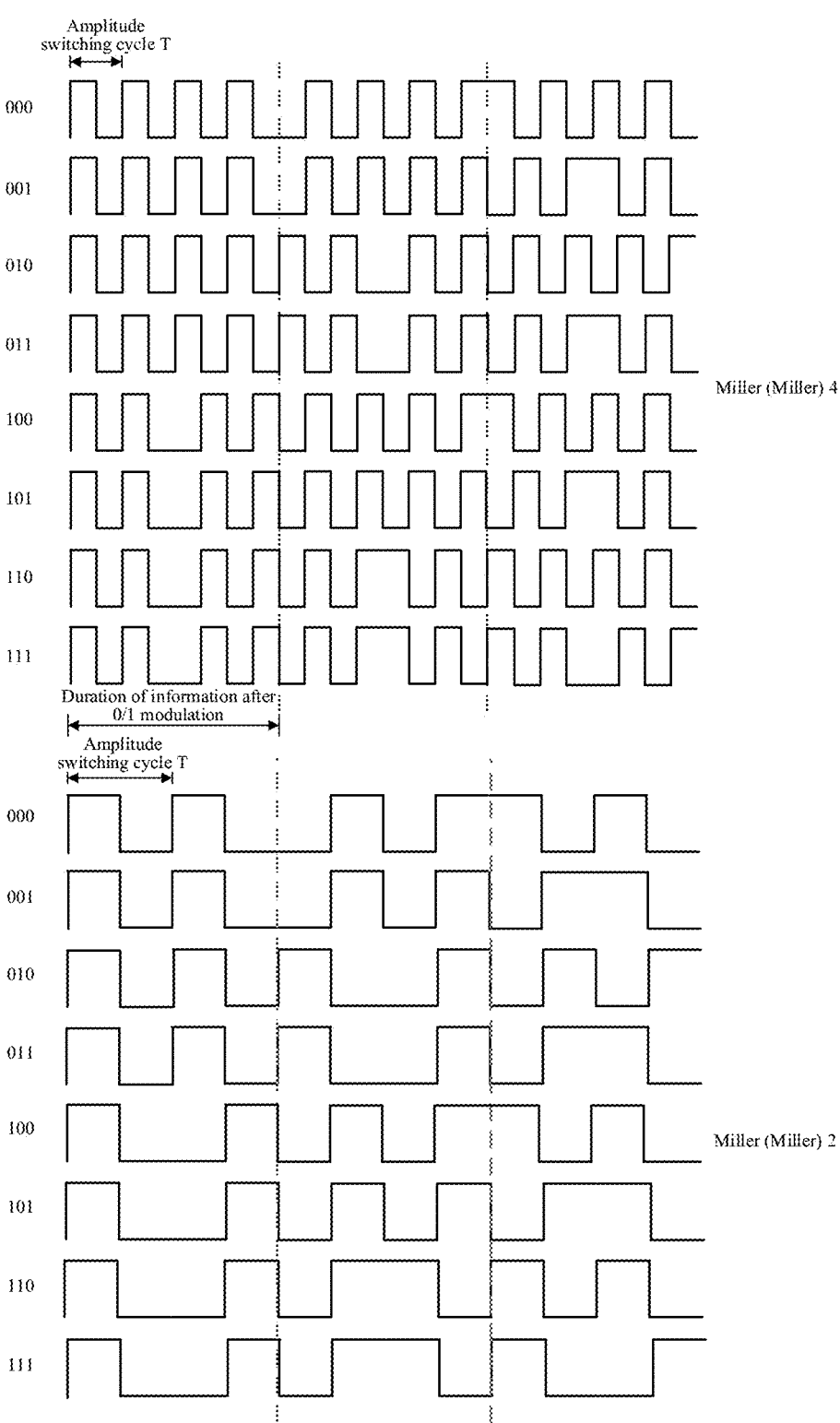
FIG. 8 is a schematic diagram of Miller (Miller) subcarrier modulation according to an embodiment of this application.

For backscatter signals in existing backscatter communication systems, a wanted signal is typically modulated by using subcarrier modulation for backscatter transmission. One implementation is as follows:

Each bit of information is modulated in multiple amplitude switching cycles. Each amplitude switching cycle T includes at least two levels, for example, a high amplitude and a low amplitude, which correspond to different reflection coefficients of tags. The subcarrier frequency is Fs=1/T. FIG. 8 shows a Miller (Miller) subcarrier modulation scheme, Based on the subcarrier modulated signal, a subcarrier is used to reflect an incident carrier with a frequency Fc, so a backscatter signal is modulated onto subcarriers at Fc+Fs and/or Fc−Fs.

For example, tag0 performs transmission of a backscatter signal on subcarrier 0, tag1 performs transmission of a backscatter signal on subcarrier 1, and tag2 performs transmission of a backscatter signal on subcarrier 2. Multiple tags can perform backscatter transmission at different subcarriers at the same time. That is, the signal of tag0 after subcarrier modulation is at Fc+Fs0 and/or Fc−Fs0; the signal of tag1 after subcarrier modulation is at Fc+Fs1 and/or Fc−Fs1; and the signal of tag2 after subcarrier modulation is at Fc+Fs2 and/or Fc−Fs2.

Tags support backscatter transmission at different subcarrier frequencies. For different subcarrier frequencies, first durations (or first amplitude switching cycles) of amplitudes are different, but when any parameter of a backscatter signal is used for transmission of the backscatter signal, it needs to ensure that second durations for transmitting the same number of bits are the same.

As shown in FIG. 8, in a case that the Miller subcarrier modulation scheme is used, signal durations of modulated information elements 0/1 are the same when different subcarrier frequencies are used. For example, tag #0 uses a subcarrier frequency of 640 kHz, and tag #1 uses a subcarrier frequency of 320 kHz. Therefore, the amplitude switching cycle and level duration of tag #0 are ½ those of tag #1. To ensure that the second durations for transmitting the same number of information bits are the same for tag #0 and tag #1, in a duration of a modulated signal of one information bit, the number of switching cycles M of tag #1 should also be ½ that of tag #0. For example, tag #0 uses the Miller 4 modulation scheme (switching times M=4) to modulate a signal, while tag #1 uses the Miller 2 modulation scheme (M=2) to modulate a signal. This ensures that second durations for backscatter transmitting the same number of information bits are the same when different parameters are used for backscatter transmission, thereby ensuring similar performance in a case that different parameters are used for backscatter transmission.

Unlike the prior art, in RFID, compared with Miller 2, Miller 4 has a longer transmission duration (second duration) after one-information-bit modulation, while the amplitude switching cycle (or first duration) remains the same. Thus, Miller 4 offers better transmission performance than Miller 2. In this embodiment, amplitude switching cycles (first duration) are different, but transmission durations (second duration) after one-information-bit modulation are the same.

In addition to using the Miller subcarrier (or referred to as Miller code subcarrier) modulation scheme, Manchester (Manchester) code and FM0 (that is, bi-phase space coding (Bi-Phase Space Coding)) code subcarrier modulation schemes can also be used in backscatter communication systems to adjust backscatter information to subcarrier frequencies.

Manner 3: Using different signal amplitude durations to modulate information carried by backscatter signals.

Manner 3 is similar to manner 2. With a duration of a high/low amplitude modified, T is changed, thereby changing a frequency of a backscatter signal.

The parameter of the backscatter signal can be predefined or indicated by the reader.

Manner 4: Performing transmission of a backscatter signal at a specific frequency.

In one implementation, the tag can locally generate to-be-transmitted signals of one or more frequencies, without using a carrier signal for reflection. This type of tag can directly perform transmission of a backscatter signal at a specific frequency according to a control command of the reader/writer, an indicated rule, or a predefined rule.

The following describes an implementation of receiving a backscatter signal on the reader/writer side in Embodiment 1.

In manners 1, 2, and 3, the tag can perform double-sideband modulation on a signal on a basis of carrier signal, that is, generate a frequency component in a high-frequency and/or low-frequency direction of a carrier frequency. Alternatively, single-sideband modulation such as the method in manner 4 can be used. A frequency component is generated only in a high-frequency or low-frequency direction of a carrier frequency. The frequency component higher or lower than the carrier frequency contains modulation information for backscatter. The reader/writer can use a filter to filter out a specific frequency component, thereby detecting information transmitted by the backscatter signal.

Figure 9:
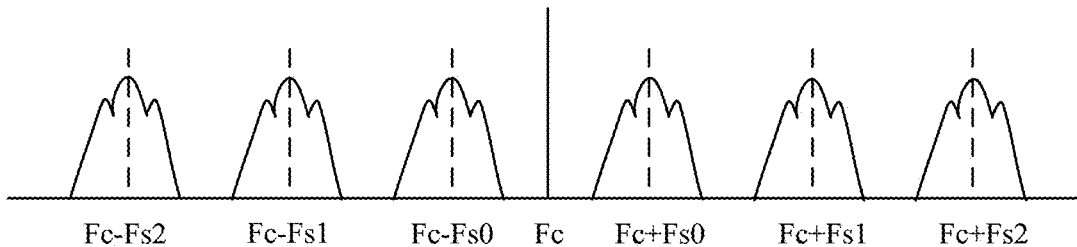
FIG. 9 is a schematic diagram of a frequency component of a backscatter signal according to an embodiment of this application.

The reader/writer can extract and demodulate signals of different frequencies by using a filter, so as to obtain backscatter transmission signals of different tags, and obtain component of the backscatter signal on the frequency. The frequency components of the backscatter signals are shown in FIG. 9.

Embodiment 2: Rules for Determining Backscatter Parameters

In existing backscatter communication systems, readers/writers typically can receive only a backscatter signal of one tag at a time. For example, in an RFID inventory process, in a case that a reader/writer transmits a control command to start an inventory process, a value Q is indicated. The tag randomly selects a value q from locally generated values in a range of $\{0, \ldots, 2^{\wedge}Q-1\}$. A tag with a current random value of 0 responds to the control command of the reader and performs transmission of a backscatter signal. A tag with a current random value not equal to 0 does not perform transmission of a backscatter signal for the time being. After completing communication with the tag with a random value of 0, the reader/writer can continue to transmit a control command (for example, queryRep), for example, indicating the tag to decrement the generated random number by 1. A tag with a random value reduced to 0 responds to the control command and performs transmission of a backscatter signal.

The above process is a random multiple access process, and there is a possibility that multiple tags may locally generate the same random number, leading to the possibility that multiple tags perform backscatter transmission simultaneously at a certain time. In this case, the reader/writer is highly unlikely to detect any backscatter signal from any tag and does not provide feedback to the tag to indicate reception of a backscatter signal. In this case, these tags continue to receive a control command from the reader/writer and wait for a new occasion for backscatter transmission. Therefore, in transmitting a control command, the reader/writer should select a reasonable Q value and can gradually adjust the Q value in an inventory process to reduce the probability of conflicts in a process of communicating with multiple tags. Certainly, this also means that the time to complete communication with the multiple tags is prolonged.

In existing designs, if multiple tags have the same parameter of backscatter signal transmission at the same time, as a result, the reader/writer side is unable to detect backscatter signals of the multiple tags at the same time, negatively affecting the efficiency of backscatter communication with the multiple tags.

Based on the method for backscatter signal transmission of Embodiment 1, different parameters can be used for transmission of backscatter signals at the same time. This can improve the efficiency of a multi-tag communication process. For example, frequency shifting of an incident signal can be achieved through hardware, or backscatter signals of different tags can be implemented at different target frequencies by using different subcarrier modulation/amplitude durations.

The manner of determining different backscatter signal parameters by the tag includes determining the backscatter signal parameter (or determining the parameter for backscatter transmission) based on the counter value of the tag, such as:

Manner a: Determining the parameter of the backscatter signal based on the step.

Tags with current counter values of 0, 1, . . . M−1 can perform backscatter transmission simultaneously, with tags having different counter values using different parameters for backscatter transmission. Tag 0 uses parameter 0, tag 1 uses parameter 1, . . . , and tag m uses parameter m for backscatter transmission, where 0<=m<=M−1. The counter value can be a random number generated locally by the tag, or a counter value obtained by modifying (decrementing/incrementing) the random number.

Alternatively, tags with different IDs use different parameters for backscatter transmission. Tag ID #0 uses parameter 0, tag ID #1 uses parameter 1, . . . , and tag ID #m uses parameter m for backscatter transmission, where 0<=m<=M−1. The ID is a temporary ID of UE, an ID indicated by the reader/writer, a product code PC, or an electronic product code EPC. The tag can determine the backscatter signal parameter based on an output obtained by performing a certain operation on the ID value. For example, if mod(ID, M)=m, parameter m is used for backscatter transmission.

In the above implementation, the reader/writer can indicate a random number adjusted step in the control command. For example, M can be considered as the random number adjusted step. If the control command received by the tag and indicated by the reader/writer indicates the adjusted step M>1, the tag determines, in the above manner, the parameter used by the tag for the transmission of the backscatter signal.

Manner b: Determining the parameter of the backscatter signal based on the group ID or intra-group ID.

The tag can operate in a grouping manner, where the tag includes the group ID and the intra-group ID. The parameter of the backscatter signal is determined based on the intra-group ID.

In an implementation, transmission of backscatter signals is performed for tags with a specific group ID and parameters of the backscatter signals are determined based on intra-group IDs of the tags, such as frequency, subcarrier frequency, and first amplitude duration/first amplitude switching cycle.

For example, tag #0 uses parameter 0, tag #1 uses parameter 1, . . . , and multiple tags use different parameters for backscatter transmission simultaneously.

The reader/writer can further modify the group ID of the tag by using a control command. For example, only one or more tags with a group ID of 0 perform backscatter transmission. After one or more tags with a group ID of 0 have performed transmission of backscatter signals, the reader/writer can use a control command to indicate modifying the value of the group ID, such as decrementing the group ID by 1.

In this case, previous tags with a group ID of 1 now have a group ID of 0, and these tags in the group now perform transmission of backscatter signals (or backscatter transmission for short).

In another implementation, transmission of a backscatter signal is performed for a tag with a specific intra-group ID and a parameter of the backscatter signal is determined based on the group ID of the tag, such as frequency, subcarrier frequency, and first amplitude duration/first amplitude switching cycle.

For example, tag group (Tag group) #0 uses parameter 0, tag group #1 uses parameter 1, . . . , and multiple tags use different parameters for backscatter transmission simultaneously. The reader/writer can further modify the intra-group ID of the tag by using a control command. For example, only one or more tags with an intra-group ID of 0 perform backscatter transmission. After one or more tags with an intra-group ID of 0 have performed backscatter transmission, the reader/writer can use a control command to indicate modifying the value of the intra-group ID, such as decrementing the intra-group ID by 1. In this case, a previous tag with an intra-group ID of 1 now has an intra-group ID of 0, and multiple tags with an intra-group ID of 0 now perform backscatter transmission.

The group ID or intra-group ID of the tag in this embodiment can be determined based on one of the following: the identifier (denoted as A) or temporary identifier (denoted as B) of the tag, the random number generated by the tag (denoted as C), the counter value of the tag (denoted as D), and information indicated by the reader/writer.

Manner c: The parameter of the backscatter signal is determined by performing a simple operation on the identifier (A) or temporary identifier (B) of the tag, the random number generated by the tag (C), or the counter value of the tag (D).

For example, the parameter of the backscatter signal is determined based on the value of m=mod(A/B/C/D, M). M is indicated by the reader/writer or predefined. The tag performs the transmission of the backscatter signal by using parameter m.

Manner d: Whether to use multiple tags to perform parallel backscatter is determined based on the process number or session number.

For different purposes, the reader/writer can use multiple sessions or processes to communicate with multiple tags.

For example, the reader/writer needs to communicate with multiple tags, such as performing a tag inventory (inventory). For communication of a specific session (session) or specific process (process), the above manner is used for backscatter transmission. The specific session number (session number) or process number (process number) can be predefined or indicated by the reader/writer.

Embodiment 3: Signaling Indication

Optionally, related indication signaling is indicated by the reader/writer. The relevant information can be indicated in a control command. The control command is used to select some tags that meet a condition or all tags to start a communication process. Alternatively, the control command can be used to indicate the value Q for generating the random number, so as to change a random number. In indicating these parameters, relevant parameters required for the process are indicated, for example, the random number adjusted step size M. Alternatively, these commands are used to indicate to the tag whether to use the above manner for backscatter communication.

Optionally, the parameter of the backscatter signal can alternatively be indicated by the above control command, including at least one of the following:

(a) different frequency shifts relative to an incident carrier wave signal, where the frequency shifts are predefined or indicated by the reader/writer;

(b) N times or 1/N relative to the reference subcarrier frequency; and (c) K times or 1/K relative to the reference amplitude duration.

Figure 10:
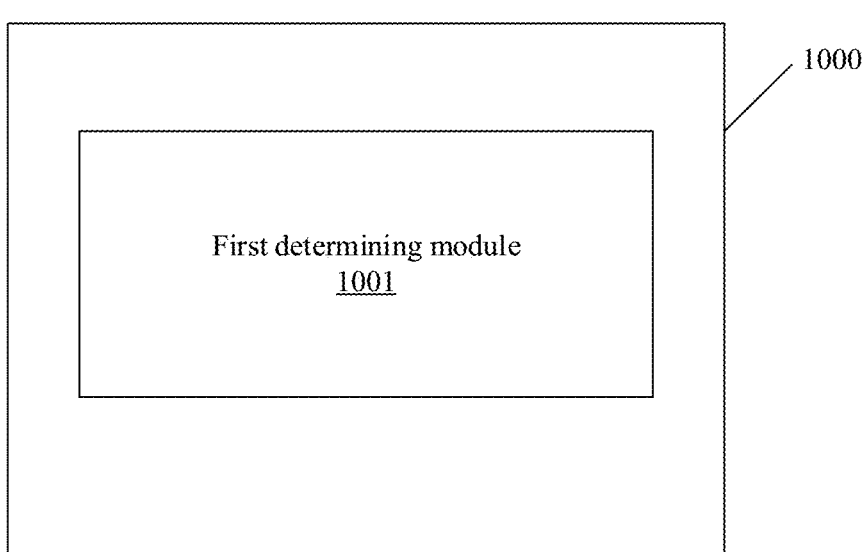
FIG. 10 is a first schematic diagram of an apparatus for backscatter signal transmission according to an embodiment of this application.

Referring to FIG. 10, an embodiment of this application provides an apparatus for backscatter signal transmission, applied to a tag, where the apparatus 1000 includes:

a first determining module 1001 configured to determine, based on first information, a parameter related to transmission of a backscatter signal; where the first information includes at least one of the following:

(1) a first identifier, where the first identifier includes an identifier of the tag or a temporary identifier of the tag;

(2) a first value, where the first value is used to indicate a random number generated by the tag;

(3) a second value, where the second value is used to indicate a counter value of the tag;

(4) a third value, where the third value is used to indicate a counter step of the tag;

(5) a group identifier or intra-group identifier of the tag;

(6) a session number (session number) or a process number (process number); and (7) information received from a reader/writer.

The parameter of the backscatter signal includes at least one of the following:

(1) The parameter of the backscatter signal, where the parameter of the backscatter signal is used to indicate performing transmission of the backscatter signal.

(2) A second parameter, where the second parameter is used to indicate not performing the transmission of the backscatter signal.

(3) A third parameter, where the third parameter is used to indicate a frequency of the backscatter signal.

(4) A subcarrier (subcarrier) frequency of the backscatter signal.

The subcarrier can also be described as a sub-carrier.

(5) A first duration or first amplitude switching cycle of the backscatter signal.

In an embodiment of this application, the third parameter is a first frequency shift, and the first frequency shift is used to indicate a frequency shift relative to an incident carrier frequency; the subcarrier frequency of the backscatter signal is N times or 1/N times a reference subcarrier frequency; or the first duration is K times or 1/K times a reference amplitude duration; where N and K are natural numbers greater than 0.

In an embodiment of this application, one or more of the incident carrier frequency, the reference subcarrier frequency, the reference amplitude duration, the first frequency shift, N, and K are predefined or indicated by the reader/writer.

In an embodiment of this application, the apparatus further includes:

a first receiving module configured to receive second information, where the second information is used to indicate the tag to determine, based on the first information, the parameter related to the transmission of the backscatter signal, or the second information is used to indicate the tag to determine, based on a specific session number or process number, the parameter related to the transmission of the backscatter signal.

In an embodiment of this application, the first determining module 1001 is further configured to:

in a case that the first information includes the third value and the third value is greater than 1, determine, based on the first information, the parameter related to the transmission of the backscatter signal.

In an embodiment of this application, the apparatus further includes:

a first transmission module configured to: in a case that the counter value of the tag is any one of 0 to a fourth value, perform the transmission of the backscatter signal, where the fourth value is equal to the third value minus 1, and the third value is greater than or equal to 1.

In an embodiment of this application, the apparatus further includes:

a second receiving module configured to receive third information, where the third information is used to indicate the tag to subtract the third value from the counter value.

In an embodiment of this application, the first determining module 1001 is further configured to:

in a case that the group identifier of the tag is a specific group identifier, determine the parameter based on the intra-group identifier of the tag; or in a case that the intra-group identifier of the tag is a specific intra-group identifier, determine the parameter based on the group identifier of the tag.

In an embodiment of this application, the group identifier or intra-group identifier of the tag is determined based on one of the following: the first identifier; the first value; the second value; or information indicated by the reader/writer.

In an embodiment of this application, the first determining module 1001 is further configured to:

determine, as the parameter, a remainder obtained by dividing the first identifier, the first value, or the second value by a fifth value; where the fifth value is indicated by the reader/writer or predefined.

In an embodiment of this application, the apparatus further includes a third receiving module configured to receive fourth information, where the fourth information is used to indicate at least one of the following:

modifying the group identifier of the tag;

performing, by a tag with a specific group identifier, the transmission of the backscatter signal;

modifying the intra-group identifier of the tag; or performing, by a tag with a specific intra-group identifier, the transmission of the backscatter signal.

In an embodiment of this application, at least one of the first information, the second information, the third information, and the fourth information is carried in a control command transmitted by the reader/writer; where the control command includes at least one of the following: select command, query command, query repeat command, and query adjust command.

In an embodiment of this application, the apparatus further includes:

a third transmission module, configured to perform the transmission of the backscatter signal based on a first requirement and the parameter of the backscatter signal; where the first requirement includes: in a case that the tag uses any one of the parameter of the backscatter signal to perform the transmission of the backscatter signal, if the numbers of bits transmitted are the same, second durations for transmitting the same number of bits are the same.

In an embodiment of this application, in a case that a subcarrier frequency of the backscatter signal is N times a reference subcarrier frequency, the number of amplitude switching cycles corresponding to the subcarrier frequency of the backscatter transmission in the second duration is 1/N the number of amplitude switching cycles corresponding to the reference subcarrier frequency.

In an embodiment of this application, the amplitude switching cycle successively includes a high amplitude and a low amplitude, or a low amplitude and a high amplitude, where a sum of a duration of the high amplitude and a duration of the low amplitude is the amplitude switching cycle.

In an embodiment of this application, information carried in the backscatter signal includes at least one of the following: the temporary identifier of the tag, a product code, a handle of the tag, an error code, or data.

Figure 11:
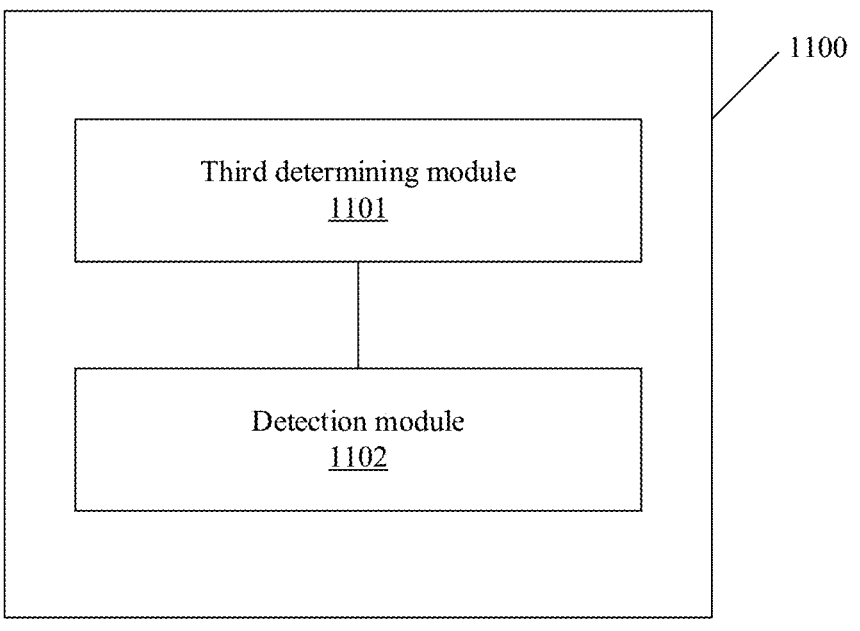
FIG. 11 is a second schematic diagram of an apparatus for backscatter signal transmission according to an embodiment of this application.

Referring to FIG. 11, an embodiment of this application provides an apparatus for backscatter signal transmission, applied to a reader/writer, where the apparatus 1100 includes:

a third determining module 1101 configured to determine, based on first information, a parameter related to transmission of a backscatter signal; and a detection module 1102 configured to perform detection for the backscatter signal based on the parameter, where the first information includes at least one of the following:

(1) a first identifier, where the first identifier includes an identifier of the tag or a temporary identifier of the tag;

(2) a first value, where the first value is used to indicate a random number generated by the tag;

(3) a second value, where the second value is used to indicate a counter value of the tag;

(4) a third value, where the third value is used to indicate a counter step of the tag;

(5) a group identifier or intra-group identifier of the tag;

(6) a session number (session number) or a process number (process number); and (7) information received from the reader/writer.

In an embodiment of this application, the parameter of the backscatter signal includes at least one of the following:

(1) The parameter of the backscatter signal, where the parameter of the backscatter signal is used to indicate performing transmission of the backscatter signal.

(2) A second parameter, where the second parameter is used to indicate not performing the transmission of the backscatter signal.

(3) A third parameter, where the third parameter is used to indicate a frequency of the backscatter signal.

(4) A subcarrier (subcarrier) frequency of the backscatter signal.

The subcarrier can also be described as a sub-carrier.

(5) A first duration or first amplitude switching cycle of the backscatter signal.

In an embodiment of this application, the performing, by the reader/writer, detection for the backscatter signal based on the parameter includes:

performing, by the reader/writer, detection for the backscatter signal based on the parameter in at least one bandwidth range.

In an embodiment of this application, the third parameter is a first frequency shift, and the first frequency shift is used to indicate a frequency shift relative to an incident carrier frequency;

the subcarrier frequency of the backscatter signal is N times or 1/N times a reference subcarrier frequency; or the first duration is K times or 1/K times a reference amplitude duration; where N and K are natural numbers greater than 0.

In an embodiment of this application, one or more of the incident carrier frequency, the reference subcarrier frequency, the reference amplitude duration, the first frequency shift, N, and K are predefined or determined by the reader/writer.

In an embodiment of this application, the apparatus further includes:

a first transmitting module configured to transmit second information, where the second information is used to indicate the tag to determine, based on the first information, the parameter related to the transmission of the backscatter signal, or the second information is used to indicate the tag to determine, based on a specific session number or process number, the parameter related to the transmission of the backscatter signal.

In an embodiment of this application, the apparatus further includes:

a second transmitting module configured to transmit third information, where the third information is used to indicate the tag to subtract the third value from the counter value.

In an embodiment of this application, the group identifier or intra-group identifier of the tag is determined based on one of the following: the first identifier; the first value; the second value; or information indicated by the reader/writer.

In an embodiment of this application, the apparatus further includes:

a third transmitting module configured to transmit fourth information, where the fourth information is used to indicate at least one of the following:

modifying the group identifier of the tag;

performing, by a tag with a specific group identifier, the transmission of the backscatter signal;

modifying the intra-group identifier of the tag; or performing, by a tag with a specific intra-group identifier, the transmission of the backscatter signal.

In an embodiment of this application, at least one of the first information, the second information, the third information, and the fourth information is carried in a control command; where the control command includes at least one of the following: select command, query command, query repeat command, and query adjust command.

In an embodiment of this application, the reader/writer includes a terminal, a base station, a specialized receiving device, or a specialized transmitting device.

The apparatus provided in this embodiment of this application can implement the processes implemented in the method embodiments of FIG. 7, with the same technical effects achieved. To avoid repetition, details are not described herein again.

Figure 12:
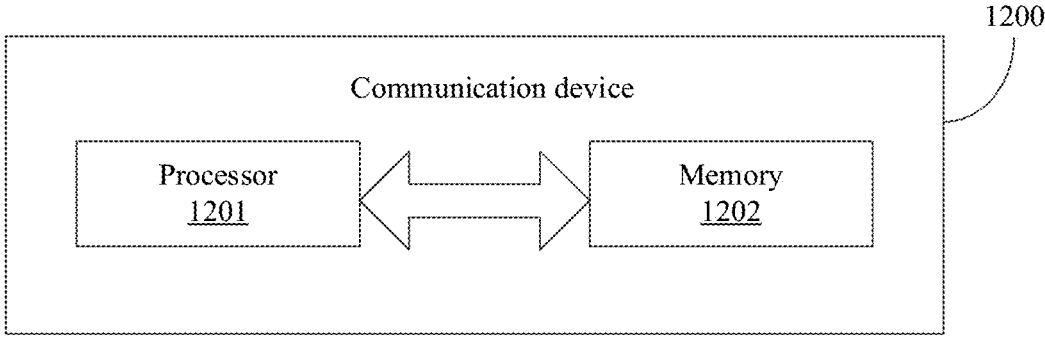
FIG. 12 is a schematic diagram of a communication device according to an embodiment of this application.

As shown in FIG. 12, an embodiment of this application further provides a communication device 1200 including a processor 1201 and a memory 1202. The memory 1202 stores a program or an instruction capable of running on the processor 1201. For example, in a case that the communication device 1200 is a terminal, when the program or the instruction is executed by the processor 1201, the steps of the foregoing method embodiments of FIG. 6 or 7 are implemented, with the same technical effects achieved. To avoid repetition, details are not described herein again.

An embodiment of this application further provides a readable storage medium. The readable storage medium stores a program or an instruction, and when the program or instruction is executed by a processor, the processes of the foregoing method of FIG. 6 or 7 and the foregoing embodiments are implemented, with the same technical effects achieved. To avoid repetition, details are not described herein again.

The processor is the processor in the terminal in the foregoing embodiments. The readable storage medium includes a computer-readable storage medium such as a computer read-only memory ROM, a random access memory RAM, a magnetic disk, or an optical disc.

An embodiment of this application further provides a chip. The chip includes a processor and a communication interface. The communication interface is coupled to the processor. The processor is configured to run a program or an instruction to implement the processes of FIG. 6 or 7 and the foregoing method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program/program product, where the computer program/program product is stored in a storage medium, and the computer program/program product is executed by at least one processor to implement the processes shown in FIG. 6 or 7 and of the method embodiments, with the same technical effects achieved. To avoid repetition, details are not described herein again.

An embodiment of this application further provides a communication system. The communication system includes a terminal and a network-side device. The terminal is configured to perform the processes of FIG. 6 and the foregoing method embodiments, and the network-side device is configured to perform the processes of FIG. 7 and the foregoing method embodiments, with the same technical effects achieved. To avoid repetition, details are not described herein again.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

Based on the above description of embodiments, persons skilled in the art can clearly understand that the method in the foregoing embodiments can be implemented through software on a necessary hardware platform or certainly through hardware only, but in many cases, the former is a preferred embodiment. Based on such an understanding, the technical solutions of this application essentially, or the part contributing to the prior art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. These specific embodiments are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A method for backscatter signal transmission, comprising:
determining, by a tag based on first information, a parameter related to transmission of a backscatter signal; wherein
the first information comprises at least one of the following:
a first value, wherein the first value is used to indicate a random number generated by the tag;
a second value, wherein the second value is used to indicate a counter value of the tag; or
a third value, wherein the third value is used to indicate a counter step of the tag;
wherein the parameter comprises at least one of the following:
a third parameter, wherein the third parameter is used to indicate a frequency of the backscatter signal, the third parameter is a first frequency shift, and the first frequency shift is used to indicate a frequency shift relative to an incident carrier frequency;
a subcarrier frequency of the backscatter signal, wherein the subcarrier frequency of the backscatter signal is N times or 1/N times a reference subcarrier frequency; or
a first duration or first amplitude switching cycle of the backscatter signal, wherein the first duration is K times or 1/K times a reference amplitude duration; wherein
N and K are natural numbers greater than 0.

2. The method according to claim 1, wherein the parameter further comprises at least one of the following:
a first parameter, wherein the first parameter is used to indicate performing the transmission of the backscatter signal; or
a second parameter, wherein the second parameter is used to indicate not performing the transmission of the backscatter signal.

3. The method according to claim 1, wherein the method further comprises:

receiving, by the tag, second information, wherein the second information is used to indicate the tag to determine, based on the first information, the parameter related to the transmission of the backscatter signal, or the second information is used to indicate the tag to determine, based on a specific session number or process number, the parameter related to the transmission of the backscatter signal.

4. The method according to claim 1, wherein the determining, by a tag based on first information, a parameter related to transmission of a backscatter signal comprises:

when the first information comprises the third value and the third value is greater than 1, determining, by the tag based on the first information, the parameter related to the transmission of the backscatter signal.

5. The method according to claim 4, wherein the method further comprises at least one of the following:

when the counter value of the tag is any one of 0 to a fourth value, performing, by the tag, the transmission of the backscatter signal, wherein the fourth value is equal to the third value minus 1, and the third value is greater than or equal to 1, or receiving, by the tag, third information, wherein the third information is used to indicate the tag to subtract the third value from the counter value.

6. The method according to claim 1, wherein the first information further comprises a group identifier or intra-group identifier of the tag, and the determining, by a tag based on first information, a parameter related to transmission of a backscatter signal comprises:

when the group identifier of the tag is a specific group identifier, determining, by the tag, the parameter based on the intra-group identifier of the tag; or when the intra-group identifier of the tag is a specific intra-group identifier, determining, by the tag, the parameter based on the group identifier of the tag.

7. The method according to claim 1, wherein the first information further comprises a group identifier or intra-group identifier of the tag, and the group identifier or intra-group identifier of the tag is determined based on one of the following: the first value; the second value; or information indicated by the reader/writer.

8. The method according to claim 7, wherein the determining, by the tag, the parameter based on the group identifier or intra-group identifier of the tag comprises:

determining, by the tag as the parameter, a remainder obtained by dividing the first value, or the second value by a fifth value; wherein the fifth value is indicated by the reader/writer or predefined.

9. The method according to claim 7, wherein the method further comprises:

receiving, by the tag, fourth information, wherein the fourth information is used to indicate at least one of the following:

modifying the group identifier of the tag;

performing, by a tag with a specific group identifier, the transmission of the backscatter signal;

modifying the intra-group identifier of the tag; or performing, by a tag with a specific intra-group identifier, the transmission of the backscatter signal.

10. The method according to claim 1, wherein the first information is carried in a control command transmitted by the reader/writer; wherein the control command comprises at least one of the following: select command, query command, query repeat command, and query adjust command.

11. The method according to claim 1, wherein the method further comprises:

performing, by the tag, the transmission of the backscatter signal based on a first requirement and the parameter of the backscatter signal; wherein the first requirement comprises: when the tag uses any one of the parameter of the backscatter signal to perform the transmission of the backscatter signal, if the numbers of bits transmitted are the same, second durations for transmitting the same number of bits are the same.

12. The method according to claim 11, wherein when the subcarrier frequency of the backscatter signal is N times the reference subcarrier frequency, the number of amplitude switching cycles corresponding to the subcarrier frequency of the backscatter transmission in the second duration is 1/N the number of amplitude switching cycles corresponding to the reference subcarrier frequency.

13. A method for backscatter signal transmission, comprising:

determining, by a reader/writer based on first information, a parameter related to transmission of a backscatter signal; and performing, by the reader/writer, detection for the backscatter signal based on the parameter, wherein the first information comprises at least one of the following:

a first value, wherein the first value is used to indicate a random number generated by the tag;

a second value, wherein the second value is used to indicate a counter value of the tag; or a third value, wherein the third value is used to indicate a counter step of the tag;

wherein the parameter comprises at least one of the following:

a third parameter, wherein the third parameter is used to indicate a frequency of the backscatter signal, the third parameter is a first frequency shift, and the first frequency shift is used to indicate a frequency shift relative to an incident carrier frequency;

a subcarrier frequency of the backscatter signal, wherein the subcarrier frequency of the backscatter signal is N times or 1/N times a reference subcarrier frequency; or a first duration or first amplitude switching cycle of the backscatter signal, wherein the first duration is K times or 1/K times a reference amplitude duration; wherein N and K are natural numbers greater than 0.

14. The method according to claim 13, wherein the parameter further comprises at least one of the following:

a first parameter, wherein the first parameter is used to indicate performing the transmission of the backscatter signal; or a second parameter, wherein the second parameter is used to indicate not performing the transmission of the backscatter signal.

15. The method according to claim 13, wherein the performing, by the reader/writer, detection for the backscatter signal based on the parameter comprises:

performing, by the reader/writer, detection for the backscatter signal based on the parameter in at least one bandwidth range.

16. The method according to claim 13, wherein the method further comprises at least one of the following:

transmitting, by the reader/writer, second information, wherein the second information is used to indicate the tag to determine, based on the first information, the parameter related to the transmission of the backscatter signal, or the second information is used to indicate the tag to determine, based on a specific session number or process number, the parameter related to the transmission of the backscatter signal, or transmitting, by the reader/writer, third information, wherein the third information is used to indicate the tag to subtract the third value from the counter value, or transmitting, by the reader/writer, fourth information, wherein the first information further comprises a group identifier or intra-group identifier of the tag, and the fourth information is used to indicate at least one of the following:

modifying the group identifier of the tag;

performing, by a tag with a specific group identifier, the transmission of the backscatter signal;

modifying the intra-group identifier of the tag; or performing, by a tag with a specific intra-group identifier, the transmission of the backscatter signal.

17. The method according to claim 13, wherein the reader/writer comprises at least one of the following: a terminal, a base station, a specialized receiving device, and a specialized transmitting device.

18. A tag comprising a processor, a memory, and a program or an instruction stored in the memory and capable of running on the processor, wherein the program or the instruction, when executed by the processor, implement the steps of:

determining, based on first information, a parameter related to transmission of a backscatter signal; wherein the first information comprises at least one of the following:

a first value, wherein the first value is used to indicate a random number generated by the tag;

a second value, wherein the second value is used to indicate a counter value of the tag; or a third value, wherein the third value is used to indicate a counter step of the tag;

wherein the parameter comprises at least one of the following:

a third parameter, wherein the third parameter is used to indicate a frequency of the backscatter signal, the third parameter is a first frequency shift, and the first frequency shift is used to indicate a frequency shift relative to an incident carrier frequency;

a subcarrier frequency of the backscatter signal, wherein the subcarrier frequency of the backscatter signal is N times or 1/N times a reference subcarrier frequency; or a first duration or first amplitude switching cycle of the backscatter signal, wherein the first duration is K times or 1/K times a reference amplitude duration; wherein N and K are natural numbers greater than 0.

19. The tag according to claim 18, wherein the steps further comprise:

receiving second information, wherein the second information is used to indicate the tag to determine, based on the first information, the parameter related to the transmission of the backscatter signal, or the second information is used to indicate the tag to determine, based on a specific session number or process number, the parameter related to the transmission of the backscatter signal.

* * * * *